(12) United States Patent
Somekawa

(10) Patent No.: US 12,179,692 B2
(45) Date of Patent: Dec. 31, 2024

(54) VEHICLE SEAT

(71) Applicant: TOYOTA BOSHOKU KABUSHIKI KAISHA, Aichi (JP)

(72) Inventor: Tatsuya Somekawa, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 110 days.

(21) Appl. No.: 18/090,819

(22) Filed: Dec. 29, 2022

(65) Prior Publication Data
US 2023/0226995 A1    Jul. 20, 2023

(30) Foreign Application Priority Data

Jan. 18, 2022    (JP) .................................. 2022-005664

(51) Int. Cl.
*B60R 22/26*    (2006.01)
*B60N 2/68*    (2006.01)
*B60R 22/18*    (2006.01)

(52) U.S. Cl.
CPC .............. *B60R 22/26* (2013.01); *B60N 2/688* (2013.01); *B60R 2022/1818* (2013.01); *B60R 2022/266* (2013.01)

(58) Field of Classification Search
CPC ................................ B60N 2/688; B60R 22/26
See application file for complete search history.

(56) References Cited

U.S. PATENT DOCUMENTS 10,144,326 B2 * 12/2018  Hayashi ................. B60N 2/688

FOREIGN PATENT DOCUMENTS

JP    5305430 B2    10/2013

* cited by examiner

*Primary Examiner* — Syed A Islam
(74) *Attorney, Agent, or Firm* — Greenblum & Bernstein, P.L.C.

(57) ABSTRACT

Provided is a vehicle seat in which a transverse guide of a belt guide is located on a seat front side and an upper side with respect to two fixation portions of the belt guide and in which two side guides each include a linear portion extending linearly from the transverse guide toward a back frame.

9 Claims, 6 Drawing Sheets

VEHICLE SEAT

CROSS-REFERENCE TO RELATED APPLICATIONS

This application claims the benefit of Japanese Patent Application No. 2022-005664 filed on Jan. 18, 2022 with the Japan Patent Office, and the entire disclosure of Japanese Patent Application No. 2022-005664 is incorporated herein by reference.

BACKGROUND

The present disclosure relates to a vehicle seat comprising a belt guide for a seat belt.

As shown in the official gazette of Japanese Patent No. 5305430, a belt guide for a seat belt is arranged at an upper side of a seatback, and is subjected to a tension generated in a so-called shoulder belt.

SUMMARY

When a large tension is generated in the seat belt, a downward force, in addition to a force toward a seat front side, acts on the belt guide. If the belt guide is deformed and its position to support the seat belt is greatly displaced downward, the belt guide could become unable to support the seat belt in a proper position.

The present disclosure relates to, in view of the above-described point, one example of a vehicle seat capable of inhibiting large downward displacement of a position to support a seat belt, even when a large tension is generated in the seat belt.

A vehicle seat according to one aspect of the present disclosure comprises: a back frame forming a frame of a seatback; and a belt guide fixed to an upper side of the back frame, the belt guide being configured to transmit a tension acting on a seat belt to the back frame.

The belt guide includes: a transverse guide having a bar-like shape, the transverse guide extending in a seat-width direction and having a first end and a second end in the seat-width direction, the transverse guide being contactable with the seat belt across a full width and being subjected to a tension generated in the seat belt; a first side guide provided on the first end of the transverse guide, the first side guide extending from the transverse guide toward the back frame; a second side guide provided on the second end of the transverse guide, the second side guide extending from the transverse guide toward the back frame; a first fixation portion provided on a leading end side of the first side guide in an extending direction of the first side guide, the first fixation portion being fixed to the back frame; and a second fixation portion provided on a leading end side of the second side guide in an extending direction of the second side guide, the second fixation portion being fixed to the back frame. The transverse guide is located on a seat front side and an upper side with respect to the first and second fixation portions. The first side guide includes a first linear portion extending linearly from the transverse guide toward the back frame. The second side guide includes a second linear portion extending linearly from the transverse guide toward the back frame.

With such a configuration, in the belt guide, most of the downward load acting on the transverse guide acts on each linear portion as a compressive load. Accordingly, in the belt guide, the bending moment generated in each side guide is smaller. Resultantly, even when a large tension generated in the seat belt acts on the transverse guide, large downward displacement of a position to support the seat belt can be inhibited.

It is desirable that a cross-sectional shape of each of the first and second fixation portions be formed to be flat, and that a geometrical moment of inertia of each of the first and second side guides be larger than a geometrical moment of inertia of each of the first and second fixation portions.

It is desirable: that the first and second fixation portions be curved so as to firmly hold therein part of the back frame from a seat rear side; that the first side guide includes, on a leading end side thereof in an extending direction thereof, a first connecting portion connecting with the first fixation portion; that the first connecting portion includes a first load receiving portion that is in contact with the back frame and continuous with the first fixation portion, and a first curved portion curved in an arc-like shape, the first curved portion connecting the first load receiving portion and the first linear portion to each other; that the second side guide includes, on a leading end side thereof in an extending direction thereof, a second connecting portion connecting with the second fixation portion; and that the second connecting portion includes a second load receiving portion that is in contact with the back frame and continuous with the second fixation portion, and a second curved portion curved in an arc-like shape, the second curved portion connecting the second load receiving portion and the second linear portion to each other.

It is desirable that the transverse guide, the first and second linear portions, the first and second curved portions, the first and second load receiving portions, and the first and second fixation portions be formed of a single piece of steel material.

BRIEF DESCRIPTION OF THE DRAWINGS

Example embodiments of the present disclosure will be described below with reference to the accompanying drawings, in which.

DETAILED DESCRIPTION OF EXEMPLARY EMBODIMENTS

Figure 1:
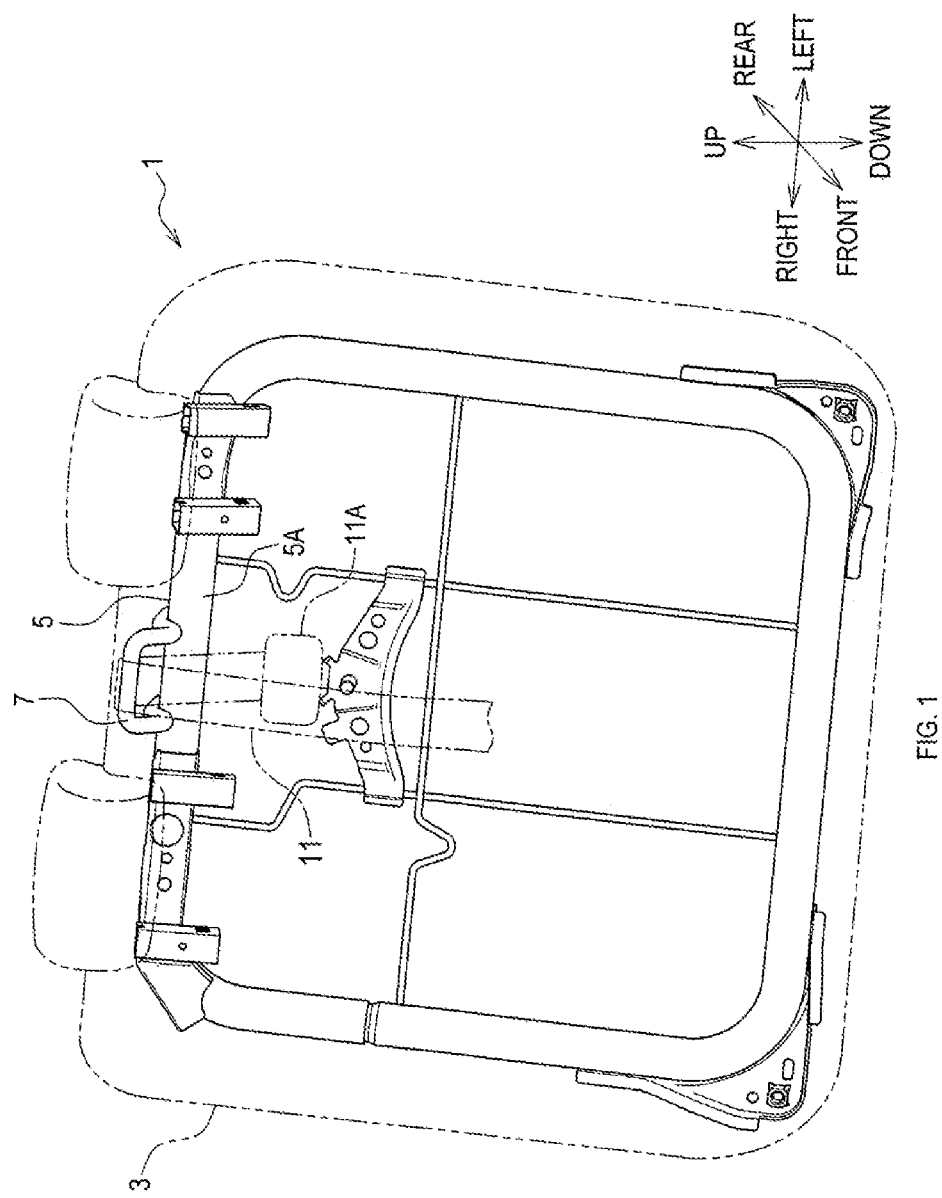
FIG. 1 is a diagram showing a back frame, a belt guide, and other elements according to a first embodiment.

Embodiments below show examples of embodiments belonging to the technical scope of the present disclosure. Invention-specifying matters and so on recited in the appended claims are not limited by specific configurations, structures, and the like indicated in the below-described embodiments.

The embodiments below are examples in which a vehicle seat according to the present disclosure is applied to a seat to be mounted in a vehicle such as a car (hereinafter referred to as a "vehicle seat"). Arrows indicating directions, hatched lines, and so on shown in the drawings are provided for the purpose of easier understanding of mutual relationships between the drawings, shapes of members or portions, and so on.

Thus, the vehicle seat is not limited by the directions shown in the drawings. The directions shown in the drawings are directions in a state where the vehicle seat according to the embodiments below is mounted in the car. The drawings with hatched lines are not necessarily sectional views.

A member or portion described at least with a reference numeral is at least one in number except in a case of being accompanied by restrictive words such as "only one". In other words, the member or portion may be two or more in number in a case of not being accompanied by the restrictive words such as "only one".

First Embodiment

1. Overview of Vehicle Seat (Seatback)

A vehicle seat 1 shown in FIG. 1 is a part of a vehicle seat used as a rear seat of a car. A seatback 3 supports an occupant's back. The seatback 3 is configured with a seatback of a seat on one end side (right side in FIG. 1) of the car in its width direction and a seatback of a center seat of the car in its width direction, which are integrated together.

The seatback 3 comprises at least a back frame 5, a belt guide 7, a cushion member (not shown), and so on. The back frame 5 forms a frame of the seatback 3. The back frame 5 according to the present embodiment is obtained by bending a metal pipe material into a substantially rectangular frame.

In a state of being mounted in a vehicle, the back frame 5, namely the seatback 3, is directly or indirectly coupled to the vehicle at a lower part on one end side in a seat-width direction, at a lower part on the other end side in the seat-width direction, and at an upper part on the one end side in the seat-width direction.

The belt guide 7 is fixed to an upper side of the back frame 5. Specifically, the belt guide 7 is fixed to a beam-like portion 5A of the back frame 5. The beam-like portion 5A extends substantially horizontally in the seat-width direction at the upper side of the back frame 5.

The belt guide 7 is subjected to a tension generated in a seat belt 11, and transmits the tension to the back frame 5. A retractor (a winder) 11A for the seat belt 11 is fixed to the back frame 5 via a reinforcing wire or the like.

When the seat belt 11 is used, a shoulder belt of the seat belt 11 is in a state of extending obliquely from the belt guide 7 toward a lower side. Thus, when a tension is generated in the seat belt 11, at least a load toward a seat front side and a downward load act on the belt guide 7.

2. Structure of Belt Guide

Figure 2:
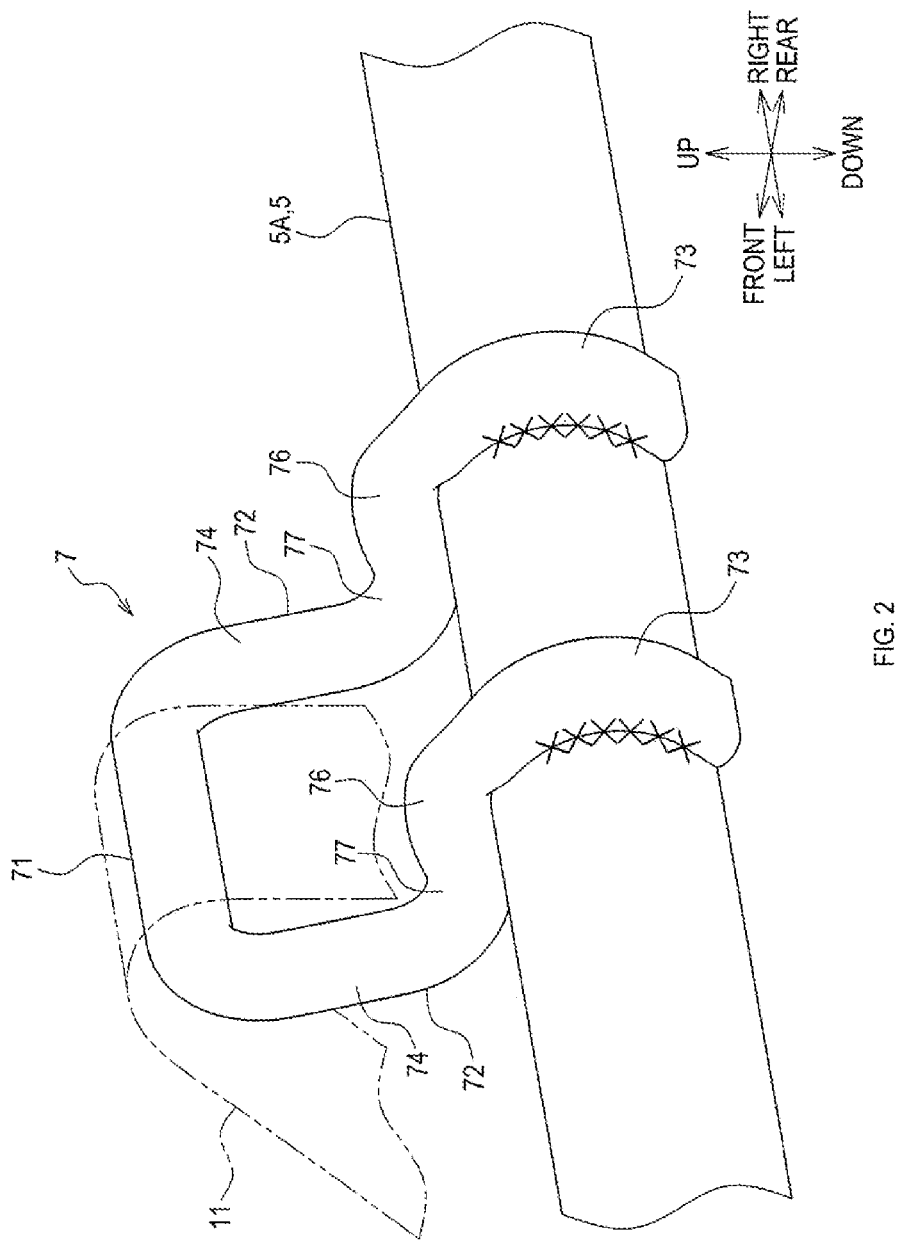
FIG. 2 is a diagram showing the belt guide according to the first embodiment.
Figure 3:
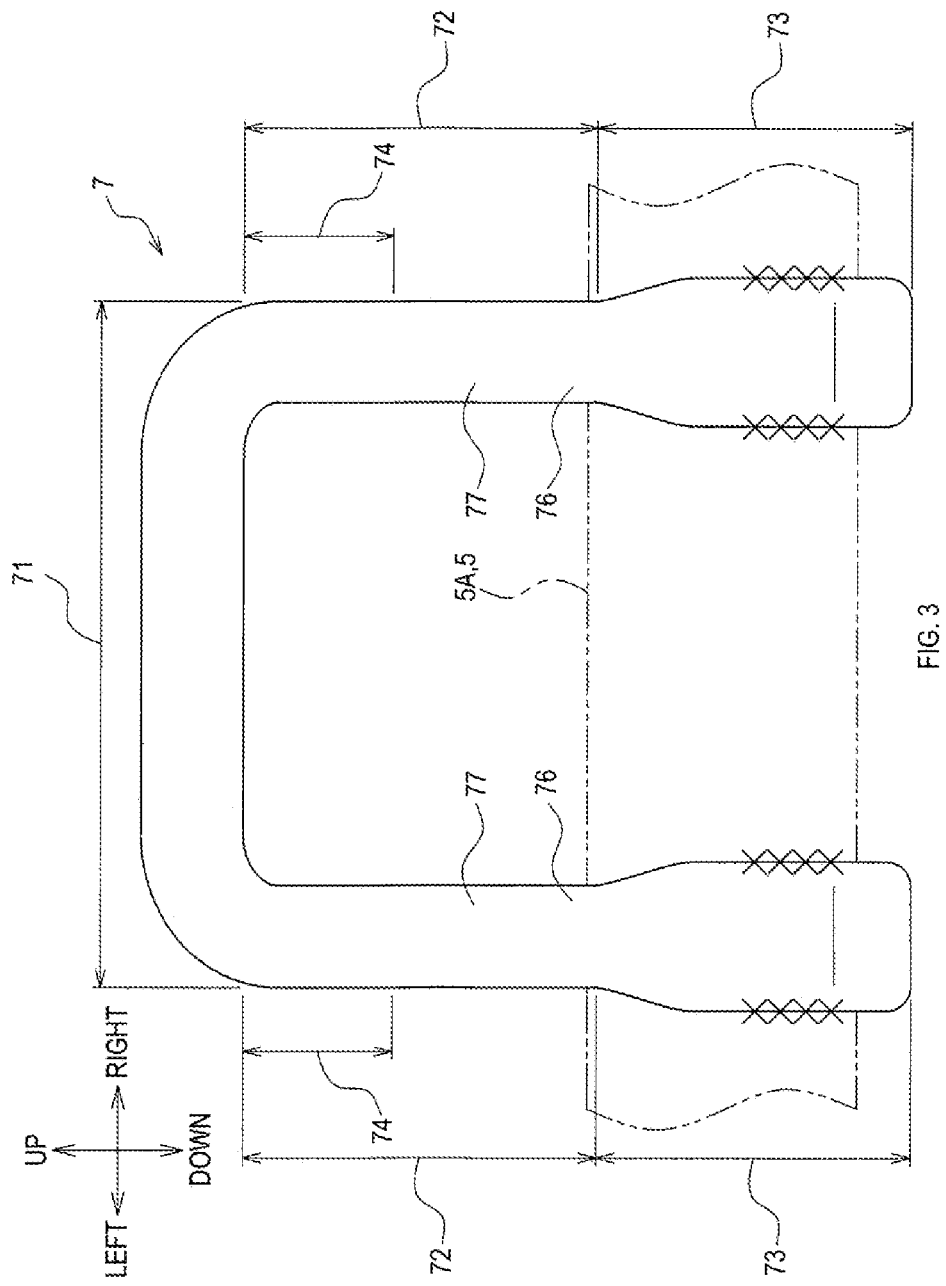
FIG. 3 is a diagram showing the belt guide according to the first embodiment.
Figure 4:
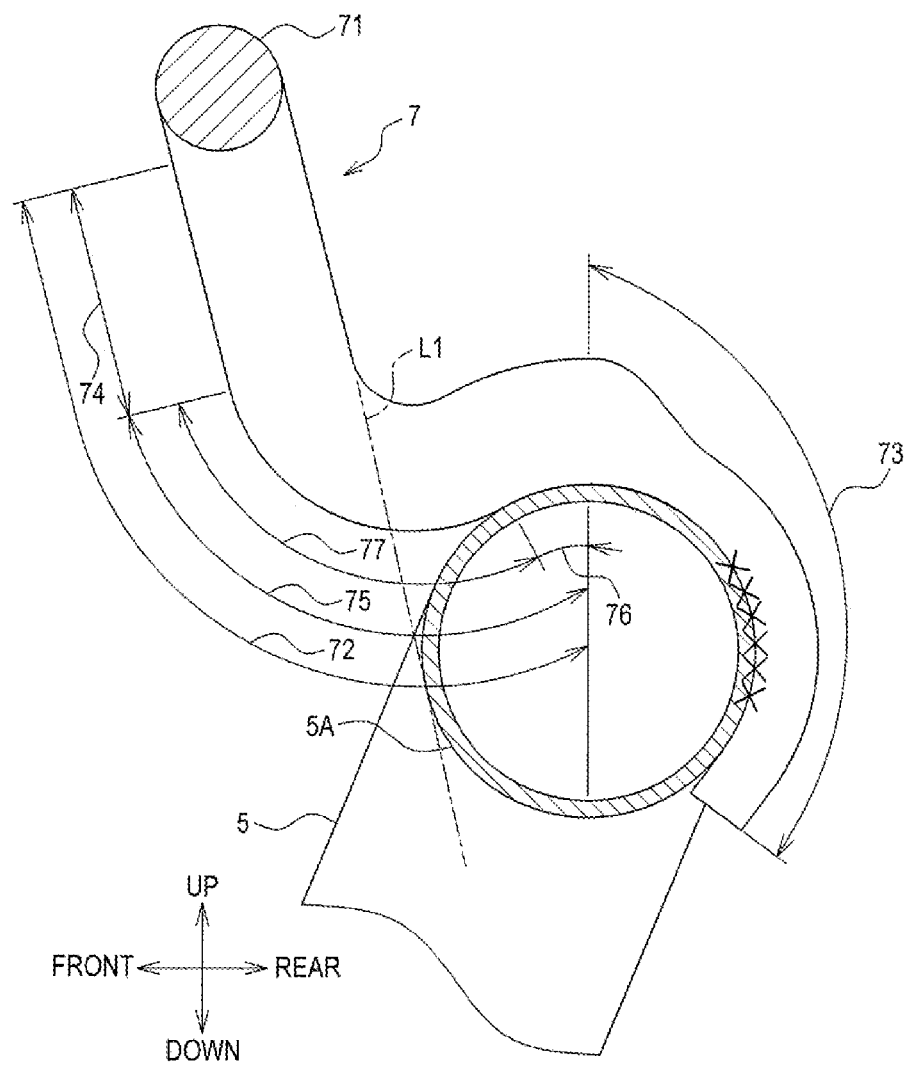
FIG. 4 is a diagram showing the belt guide according to the first embodiment.

As shown in FIGS. 2 and 3, the belt guide 7 comprises one transverse guide 71, two side guides 72, two fixation portions 73, and so on. As shown in FIG. 4, the two side guides 72 each comprise a linear portion 74, a connecting portion 75, and so on. The connecting portion 75 comprises a load receiving portion 76, a curved portion 77, and so on.

As shown in FIG. 2, the transverse guide 71 is a bar-like shaped portion extending in the seat-width direction and contactable with the seat belt 11 across its full width, and is subjected to a tension generated in the seat belt 11.

As shown in FIG. 3, each of the two side guides 72 is provided on a corresponding end side of the transverse guide 71 in a longitudinal direction thereof, and extends from the transverse guide 71 toward the back frame 5.

Each of the two fixation portions 73 is provided on a leading end side of a corresponding one of the two side guides 72 in an extending direction thereof, and is fixed to the back frame 5. As shown in FIG. 4, each fixation portion 73 is curved into a C-like shape so as to firmly hold therein part of the back frame 5 from a seat rear side.

Each fixation portion 73 according to the present embodiment is welded and fixed to the back frame 5 at a portion indicated by "XXXX" in FIG. 4. In other words, the belt guide 7 according to the present embodiment is welded and fixed onto a surface of the back frame 5 at the seat rear side.

The transverse guide 71 is located on a seat front side and an upper side with respect to each fixation portion 73. Specifically, the transverse guide 71 is located frontward of a front end of the back frame 5 and upward of an upper end of the back frame 5.

The two linear portions 74 each extend linearly from the transverse guide 71 toward the back frame 5. In the present embodiment, assuming that each linear portion 74 is extended to the back frame 5, the extended linear portion 74 (see an imaginary line L1) is located on the front end of the back frame 5.

Each connecting portion 75 is provided on a leading end side of the corresponding side guide 72 in an extending direction thereof, and connects with the corresponding fixation portion 73. In other words, each connecting portion 75 is located between the corresponding linear portion 74 and the corresponding fixation portion 73, thus connecting the corresponding linear portion 74 and the corresponding fixation portion 73 to each other.

Each load receiving portion 76 is in contact with the back frame 5, and is continuous with the corresponding fixation portion 73. Each load receiving portion 76 is curved so as to follow the back frame 5 to be in contact with the back frame 5, but is not welded and fixed to the back frame 5.

Each curved portion 77 is a portion curved in an arc-like shape, and connects the corresponding load receiving portion 76 and the corresponding linear portion 74 to each other. As shown in FIG. 2, the transverse guide 71, the linear portions 74, the curved portions 77, the load receiving portions 76, and the fixation portions 73 are formed of a single piece of a steel material by bending.

Figure 5:
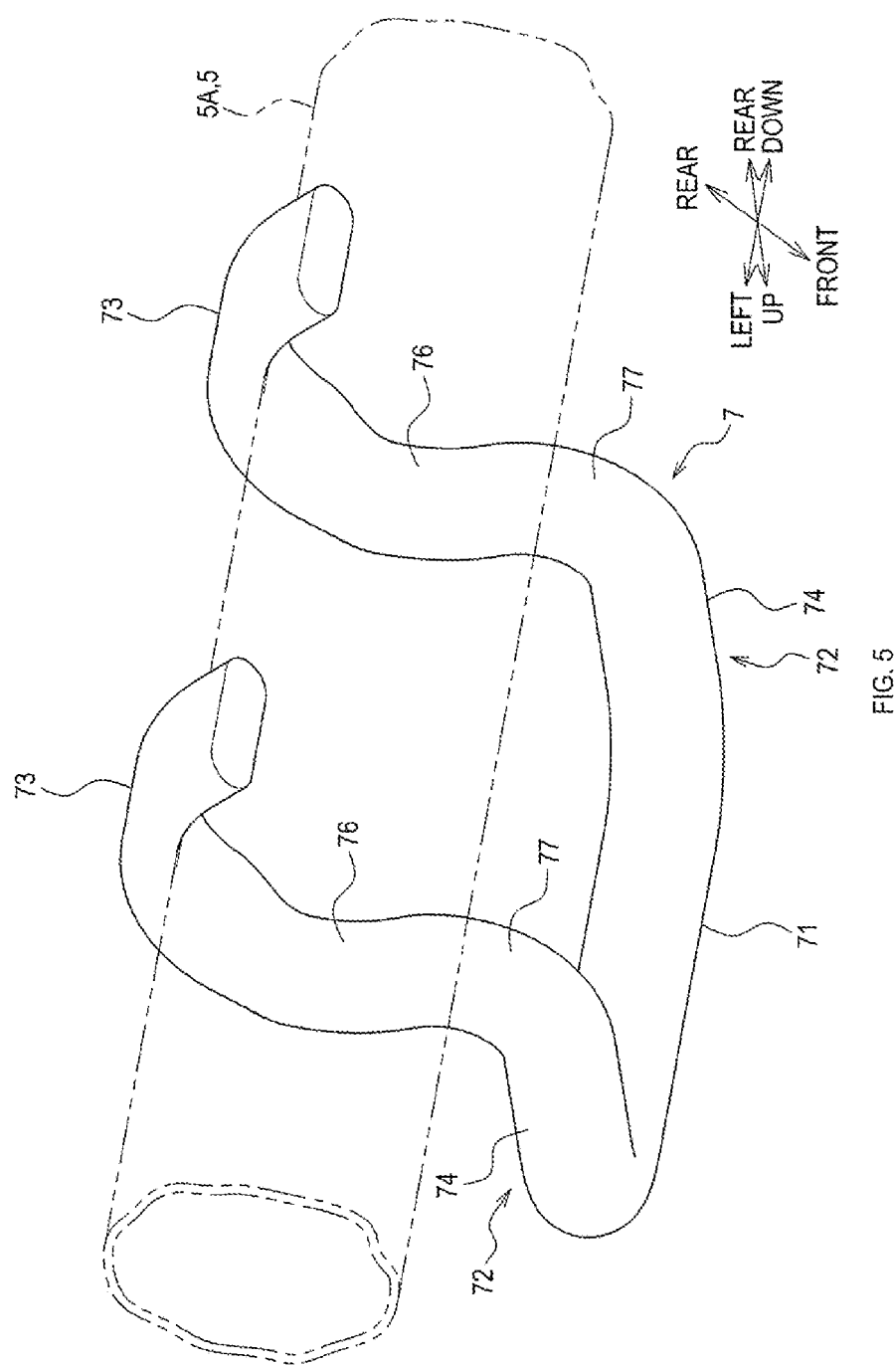
FIG. 5 is a diagram showing the belt guide according to the first embodiment.

As shown in FIG. 5, a cross-sectional shape of each fixation portion 73 is formed to be flat. A geometrical moment of inertia of each side guide 72 is larger than a geometrical moment of inertia of each fixation portion 73. The geometrical moment of inertia as used herein is a geometrical moment of inertia about a neutral axis parallel to the seat-width direction.

Specifically, the geometrical moment of inertia of each fixation portion 73 is a geometrical moment of inertia about a neutral axis parallel to a major-axis direction. The geometrical moment of inertia of each side guide 72 is a geometrical moment of inertia about a neutral axis parallel to the transverse guide 71.

In the present embodiment, cross-sectional shapes of the transverse guide 71 and each side guide 72 correspond to a cross-sectional shape of a solid round bar as a material thereof. A cross-sectional shape of each fixation portion 73 is a substantially ellipse shape obtained by flattening the solid round bar by plastic working.

3. Features of Vehicle Seat (Especially Belt Guide) According to Present Embodiment When a large tension acts on the seat belt 11, a downward load Fo (see FIG. 6) acts on the belt guide 7. Then, the downward load Fo generates a bending moment Mo that moves the transverse guide 71 downward.

Figure 6:
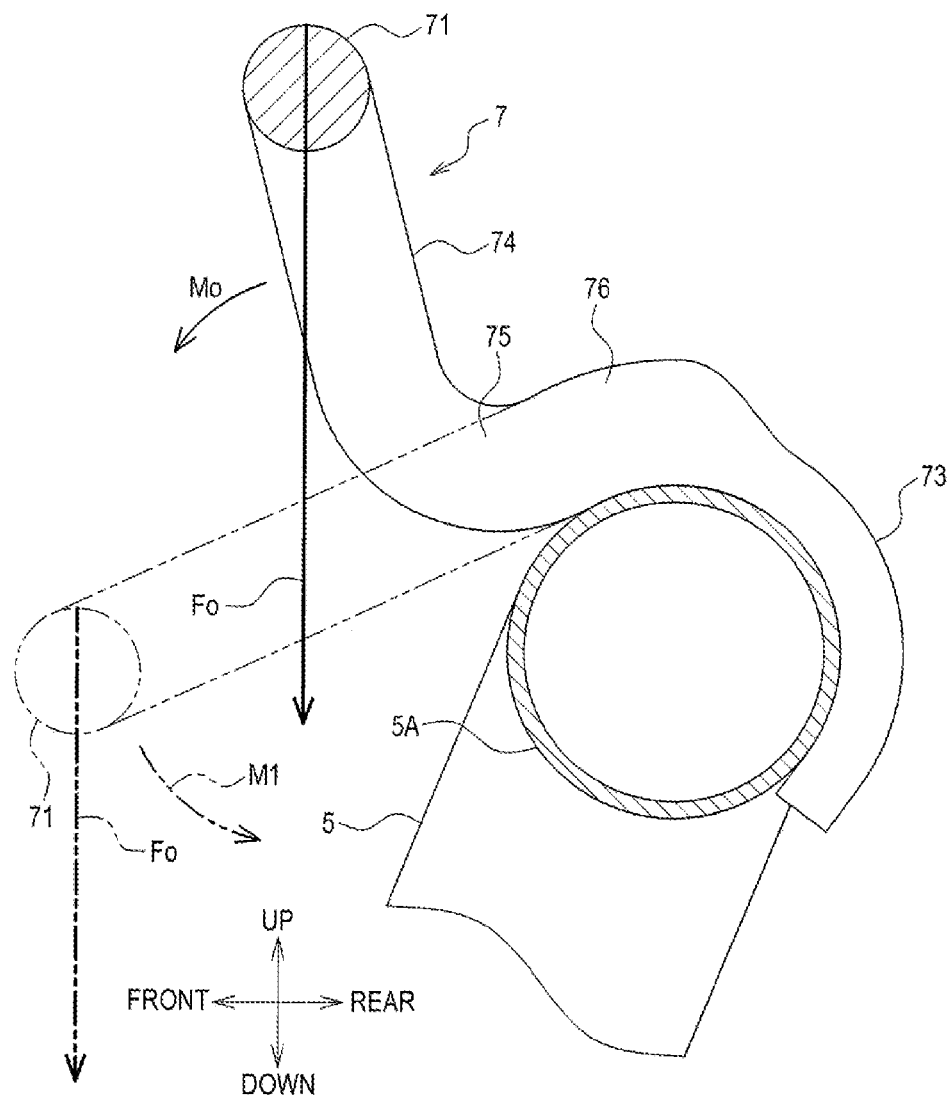
FIG. 6 is a diagram showing the belt guide according to the first embodiment.

In FIG. 6, the transverse guide 71 shown by a chain double-dashed line shows its position in a case where the connecting portion 75 is formed into a linear shape continuous with the linear portion 74. A bending moment M1 in a case where the downward load Fo acts on the transverse guide 71 shown by the chain double-dashed line is larger than the bending moment Mo because the length of an arm is longer than that in the present embodiment (see FIG. 6).

In the belt guide 7 according to the present embodiment, most of the downward load Fo acting on the transverse guide 71 acts on each linear portion 74 as a compressive load. Accordingly, in the present embodiment, the bending moment Mo is smaller because the length of the arm that generates the bending moment Mo is shorter.

Resultantly, even when a large tension generated in the seat belt 11 acts on the transverse guide 71, large downward displacement of the position to support the seat belt 11 can be inhibited. Buckling deformation of the linear portion 74 and the connecting portion 75 is negligibly small.

The solid-lined transverse guide 71 is located upward of the transverse guide 71 shown by the chain double-dashed line. Thus, even if an amount of downward displacement of the solid-lined transverse guide 71 is the same as an amount of downward displacement of the transverse guide 71 shown by the chain double-dashed line, the solid-lined transverse guide 71 after displacement is located upward of the transverse guide 71 shown by the chain double-dashed line after displacement.

Moreover, as described above, the actuality is that the amount of downward displacement of the solid-lined transverse guide 71 is smaller than the amount of downward displacement of the transverse guide 71 shown by the chain double-dashed line, and thus, large downward displacement of the position to support the seat belt 11 can be inhibited.

In addition, the geometrical moment of inertia of each of the two side guides 72 is larger than the geometrical moment of inertia of the corresponding one of the two fixation portions 73, and thus, large downward displacement of the position to support the seat belt 11 can be reliably inhibited.

Other Embodiments

In the above-described embodiment, the transverse guide 71, the linear portions 74, the curved portions 77, the load receiving portions 76, and the fixation portions 73 are formed of a single piece of steel material by bending, as shown in FIG. 2. However, the present disclosure is not limited to this.

As an alternative, the present disclosure may take a configuration in which, for example, the transverse guide 71 is configured as a separate member and each side guide 72 is an L-like shaped member configured only with the linear portion 74 and the load receiving portion 76 while the curved portion 77 is omitted.

In the above-described embodiment, each fixation portion 73 is formed so as to have a flattened shape. However, the present disclosure is not limited to this. As an alternative, the present disclosure may take a configuration in which, for example, each fixation portion 73 has the same cross-sectional shape as that of the linear portion 74 in a maintained manner.

Each fixation portion 73 according to the above-described embodiment has a form curved into a C-like shape so as to firmly hold therein part of the back frame 5 from the seat rear side. However, the present disclosure is not limited to this.

For example, it is sufficient for the present disclosure to have a shape following the contour of the beam-like portion 5A.

In the above-described embodiment, part of the fixation portion 73 is welded to the back frame 5. However, the present disclosure is not limited to this. As an alternative, the present disclosure may take a configuration in which, for example, the fixation portion 73 and the load receiving portion 76 are welded to the back frame 5.

In the above-described embodiment, assuming that each linear portion 74 is extended to the back frame 5, the extended linear portion 74 (see the imaginary line L1) is located on the front end of the back frame 5. However, the present disclosure is not limited to this.

In the above-described embodiment, the vehicle seat according to the present disclosure is applied to a car. However, application of the present disclosure is not limited to this. As an alternative, the present disclosure may also be applied to, for example, a seat used in vehicles such as railroad vehicles, ships, or aircrafts, and to a stationary seat used in theaters, at home, or in other places.

Moreover, the present disclosure only has to be consistent with the spirit of the claims, and is not limited to the above-described embodiments. Accordingly, the present disclosure may take a configuration in which at least two embodiments among the above-described embodiments are combined together, or a configuration in which any of the diagrammatically-shown constituent elements or the constituent elements described with reference numerals in the above-described embodiments are omitted.

What is claimed is:

1. A vehicle seat, comprising:
a back frame forming a frame of a seatback; and
a belt guide fixed to an upper side of the back frame, the belt guide being configured to transmit a tension acting on a seat belt to the back frame, wherein
the belt guide includes:
a transverse guide having a bar-like shape, the transverse guide extending in a seat-width direction and having a first end and a second end in the seat-width direction, the transverse guide being contactable with the seat belt across a full width and being subjected to a tension generated in the seat belt;
a first side guide provided on the first end of the transverse guide, the first side guide extending from the transverse guide toward the back frame;
a second side guide provided on the second end of the transverse guide, the second side guide extending from the transverse guide toward the back frame;
a first fixation portion provided on a leading end side of the first side guide in an extending direction of the first side guide, the first fixation portion being fixed to the back frame; and
a second fixation portion provided on a leading end side of the second side guide in an extending direction of the second side guide, the second fixation portion being fixed to the back frame,
the transverse guide is located on a seat front side and an upper side with respect to the first and second fixation portions,
the first side guide includes a first linear portion extending linearly from the transverse guide toward the back frame, and
the second side guide includes a second linear portion extending linearly from the transverse guide toward the back frame.

2. A vehicle seat, comprising:
a back frame forming a frame of a seatback; and a belt guide fixed to an upper side of the back frame, the belt guide being configured to transmit a tension acting on a seat belt to the back frame, wherein the belt guide includes:
- a transverse guide having a bar-like shape, the transverse guide extending in a seat-width direction and having a first end and a second end in the seat-width direction, the transverse guide being contactable with the seat belt across a full width and being subjected to a tension generated in the seat belt;
- a first side guide provided on the first end of the transverse guide, the first side guide extending from the transverse guide toward the back frame;
- a second side guide provided on the second end of the transverse guide, the second side guide extending from the transverse guide toward the back frame;
- a first fixation portion provided on a leading end side of the first side guide in an extending direction of the first side guide, the first fixation portion being fixed to the back frame; and
- a second fixation portion provided on a leading end side of the second side guide in an extending direction of the second side guide, the second fixation portion being fixed to the back frame, the transverse guide is located on a seat front side and an upper side with respect to the first and second fixation portions, the first side guide includes a first linear portion extending linearly from the transverse guide toward the back frame, the second side guide includes a second linear portion extending linearly from the transverse guide toward the back frame, and the transverse guide is located frontward of a front end of the back frame and upward of an upper end of the back frame.

3. A vehicle seat, comprising:
a back frame forming a frame of a seatback; and
a belt guide fixed to an upper side of the back frame, the belt guide being configured to transmit a tension acting on a seat belt to the back frame, wherein the belt guide includes:
- a transverse guide having a bar-like shape, the transverse guide extending in a seat-width direction and having a first end and a second end in the seat-width direction, the transverse guide being contactable with the seat belt across a full width and being subjected to a tension generated in the seat belt;
- a first side guide provided on the first end of the transverse guide, the first side guide extending from the transverse guide toward the back frame;
- a second side guide provided on the second end of the transverse guide, the second side guide extending from the transverse guide toward the back frame;
- a first fixation portion provided on a leading end side of the first side guide in an extending direction of the first side guide, the first fixation portion being fixed to the back frame; and
- a second fixation portion provided on a leading end side of the second side guide in an extending direction of the second side guide, the second fixation portion being fixed to the back frame, the transverse guide is located on a seat front side and an upper side with respect to the first and second fixation portions, the first side guide includes a first linear portion extending linearly from the transverse guide toward the back frame, the second side guide includes a second linear portion extending linearly from the transverse guide toward the back frame, and a lowest portion of the transverse guide is vertically higher than a highest portion of the first and second fixation portions.

4. The vehicle seat according to claim 3, wherein
the first side guide includes a first curved portion arranged between the first linear portion and the first fixation portion and curved toward the upper side, and
the second side guide includes a second curved portion arranged between the second linear portion and the second fixation portion and curved toward the upper side.

5. The vehicle seat according to claim 3, wherein
a cross-sectional shape of each of the first and second fixation portions is formed to be flat, and
a geometrical moment of inertia of each of the first and second side guides is larger than a geometrical moment of inertia of each of the first and second fixation portions.

6. The vehicle seat according to claim 3, wherein
the first and second fixation portions are curved so as to firmly hold therein part of the back frame from a seat rear side,
the first side guide includes, on a leading end side thereof in an extending direction thereof, a first connecting portion connecting with the first fixation portion,
the first connecting portion includes:
- a first load receiving portion that is in contact with the back frame and continuous with the first fixation portion; and
- a first curved portion curved in an arc-like shape, the first curved portion connecting the first load receiving portion and the first linear portion to each other, the second side guide includes, on a leading end side thereof in an extending direction thereof, a second connecting portion connecting with the second fixation portion, and
the second connecting portion includes:
- a second load receiving portion that is in contact with the back frame and continuous with the second fixation portion; and
- a second curved portion curved in an arc-like shape, the second curved portion connecting the second load receiving portion and the second linear portion to each other.

7. The vehicle seat according to claim 6, wherein
the transverse guide, the first and second linear portions, the first and second curved portions, the first and second load receiving portions, and the first and second fixation portions are formed of a single piece of steel material.

8. The vehicle seat according to claim 3, wherein
the first and second fixation portions are curved so as to firmly hold therein part of the back frame from a seat rear side,
the first side guide includes, on a leading end side thereof in an extending direction thereof, a first connecting portion connecting with the first fixation portion,
the first connecting portion includes:
- a first load receiving portion that is in contact with the back frame and continuous with the first fixation portion; and a first curved portion curved in an arc-like shape, the first curved portion connecting the first load receiving portion and the first linear portion to each other, the second side guide includes, on a leading end side thereof in an extending direction thereof, a second connecting portion connecting with the second fixation portion, and the second connecting portion includes:
- a second load receiving portion that is in contact with the back frame and continuous with the second fixation portion; and
- a second curved portion curved in an arc-like shape, the second curved portion connecting the second load receiving portion and the second linear portion to each other.

9. The vehicle seat according to claim 8, wherein the transverse guide, the first and second linear portions, the first and second curved portions, the first and second load receiving portions, and the first and second fixation portions are formed of a single piece of steel material.

* * * * *